United States Patent
Hadley et al.

(10) Patent No.: US 10,882,440 B1
(45) Date of Patent: Jan. 5, 2021

(54) STRAP SECUREMENT APPARATUS FOR CLASS 8 WIDE-BODY REFRIGERATION UNITS OF REFRIGERATED SEMI-TRAILERS

(71) Applicants: John Jonathan Hadley, Gulfport, MS (US); Barbara G. Freridge-Hadley, Gulfport, MS (US)

(72) Inventors: John Jonathan Hadley, Gulfport, MS (US); Barbara G. Freridge-Hadley, Gulfport, MS (US)

( * ) Notice: Subject to any disclaimer, the term of this patent is extended or adjusted under 35 U.S.C. 154(b) by 0 days.

(21) Appl. No.: 16/732,275

(22) Filed: Dec. 31, 2019

(51) Int. Cl.
*B60P 7/08* (2006.01)
*B62D 63/06* (2006.01)

(52) U.S. Cl.
CPC .......... *B60P 7/0823* (2013.01); *B60P 7/0807* (2013.01); *B62D 63/062* (2013.01)

(58) Field of Classification Search
CPC ..... B60P 7/0823; B60P 7/0876; B60P 7/0807; B60P 7/135; B60P 3/40; B60P 7/06; B60P 7/0815; B60P 7/0892; B62D 33/042; B62D 33/044; B62D 25/2054; B62D 33/02
USPC ... 410/97, 98, 118, 106, 100, 104, 116, 101, 410/96, 94, 99, 7, 8, 44; 24/170, 198, 24/199, 300, 302, 455, 570
See application file for complete search history.

(56) References Cited

U.S. PATENT DOCUMENTS

| 4,078,395 A | 3/1978 | Crowe et al. |
| 4,310,192 A | 1/1982 | Fitzgerald |
| D266,870 S | 11/1982 | Allard et al. |
| 4,468,060 A | 8/1984 | FitzGerald et al. |
| 4,846,610 A | 7/1989 | Schoenleben |
| 4,854,792 A | 8/1989 | Cottone |
| D311,244 S | 10/1990 | Allard et al. |
| D318,107 S | 7/1991 | Allard et al. |
| 5,152,735 A | 10/1992 | Podd, Jr. et al. |
| 5,161,848 A | 11/1992 | Lutton |
| 5,351,733 A | 10/1994 | Ullman |
| 6,000,342 A | 12/1999 | Thoman et al. |
| 6,626,625 B2 | 9/2003 | Nelson et al. |
| 6,907,747 B2 | 6/2005 | Laizer |
| 7,393,034 B2 | 7/2008 | Brussard et al. |
| 8,181,476 B2 | 5/2012 | Khan et al. |
| 8,398,343 B1 | 3/2013 | Henley et al. |
| 8,727,682 B2 | 5/2014 | Johnson et al. |
| 2008/0155781 A1 | 7/2008 | Buis |

(Continued)

*Primary Examiner* — D Glenn Dayoan
*Assistant Examiner* — Sunsurraye Westbrook
(74) *Attorney, Agent, or Firm* — Russ Weinzimmer & Associates, P.C.

(57) ABSTRACT

A strap securement apparatus for a refrigeration unit of a refrigerated semi-trailer. The apparatus includes: a curbside vertical strap, a roadside vertical strap, and a horizontal strap having connectors at each strap end configured to attach to the refrigeration unit or the front wall of the semi-trailer, also including curbside and roadside anti-vibration pads configured to reduce vibration of the panels and doors of the enclosure of the refrigeration unit. The strap securement apparatus secures the panels and doors of the refrigeration unit, is easy to install and remove from the refrigeration unit, and can include strap adjustment features to fit to a wide variety of refrigeration unit models. The strap securement apparatus can also be partially removed to provide easy access to doors and panels of the refrigeration unit. It is lightweight, can be folded into a compact size, and is easily transported to and from a refrigerated semi-trailer.

18 Claims, 10 Drawing Sheets

(56) References Cited

U.S. PATENT DOCUMENTS

| | | |
|---|---|---|
| 2008/0193248 A1 | 8/2008 | Lindblad |
| 2010/0124470 A1 | 5/2010 | McWain |
| 2010/0147728 A1 | 6/2010 | Guiles et al. |
| 2015/0253058 A1 | 9/2015 | Casasanta |

STRAP SECUREMENT APPARATUS FOR CLASS 8 WIDE-BODY REFRIGERATION UNITS OF REFRIGERATED SEMI-TRAILERS

FIELD OF THE INVENTION

This invention relates generally to refrigeration units of refrigerated semi-trailers, and particularly to safety equipment for preventing wind and vibration damage to such refrigeration units.

BACKGROUND OF THE INVENTION

In the trucking industry, temperature-sensitive cargo such as produce, dairy products, and meats are transported at refrigerated temperatures to prevent cargo spoilage. Tractor-trailer trucks with refrigerated semi-trailers are commonly used to transport refrigerated cargo. Refrigerated semi-trailers are cargo trailers having a set of rear wheels, the front of the semi-trailer being supported by the tractor of the truck. Refrigerated semi-trailers include a refrigeration unit, which is typically attached to the front of the semi-trailer, to provide cooling for the cargo contained in the semi-trailer.

The refrigeration unit (also called a "reefer" in the trucking industry) typically includes a refrigerator, which includes a compressor, coolant lines, and heat transfer coils. The refrigeration unit also typically includes a refrigerator motor to provide power for the compressor. The refrigeration unit is protected from dirt, road debris, wind, rain, ice, snow, and other environmental hazards by an enclosure that surrounds the internal components of the refrigeration unit. The enclosure is typically made from molded plastic or fiberglass, and typically includes removable panels and hinged doors that provide access to the refrigerator and the refrigerator motor so as to enable inspection or servicing of the refrigeration unit.

Because refrigerated semi-trailers often travel on long-duration road trips and travel at speeds of at least 60 to 75 miles per hour, the refrigeration unit often encounters extreme winds, buffeting by passing trucks, flying debris, bird strikes, strong vibration from rough roads, and inclement weather conditions. In addition, when traveling at reduced speed, the refrigeration unit can be impacted by roadside bush and tree branches. Consequently, the enclosure and the panels of the refrigeration unit may be damaged while the refrigerated semi-trailer is traveling along roadways.

An example of a protective guard device for an externally mounted vehicle refrigeration unit is taught by Laizer, U.S. Pat. No. 6,907,747 B2, wherein an open frame protective assembly is made from a steel frame and protective panels, the protective assembly being configured to be placed around the refrigeration unit, the protective assembly guard device also including a screen or mesh panel that protects the refrigeration unit, while also allowing air to flow through the screen or mesh panel into the refrigeration unit. However, the protective guard device of U.S. Pat. No. 6,907,747 B2 has several disadvantages. For example, the large size of the protective guard device makes it burdensome to apply and remove it from a position covering the refrigeration unit. In addition, the protective guard device of U.S. Pat. No. 6,907,747 B2 is typically permanently attached to the semi-trailer using a series of mounting holes and bolts, thereby making application and removal of the protective guard device difficult and time-consuming. Also, because the structure of the protective guard device includes a rigid fixed frame, the protective guard device must be specifically designed and manufactured for each particular brand and model of refrigeration unit, and therefore each particular version of the protective guard device can be fitted only to a particular style and size of refrigeration unit.

SUMMARY OF THE INVENTION

The strap securement apparatus of the invention can secure the doors and panels of the enclosure of a refrigeration unit of a refrigerated semi-trailer so that the doors are maintained in a closed position when the semi-trailer is traveling along a roadway. The strap securement apparatus includes anti-vibration pads to reduce door and panel vibration.

The strap securement apparatus is easy to remove from a refrigeration unit, and is easy to re-apply to the same refrigeration unit, or alternatively, is easy to remove and then apply to a different refrigeration unit. The ease with which the strap securement apparatus can be removed and applied is helpful for truckers that haul multiple refrigerated semi-trailers on one trucking route. The strap securement apparatus can also be partially removed, thereby providing easy access to any doors and panels when inspecting or servicing the refrigeration unit.

The strap securement apparatus extends across the entire outer surface of the enclosure of the refrigeration unit, thereby securing the entire outer surface of the enclosure, including the doors and panels of the refrigeration unit. This prevents damage from excess vibration caused by high winds, gusts caused by passing vehicles, impacts from flying debris, rain, hail, snow, vibration caused by rough roads, and vibration from the tractor engine, transmission, and wheels.

The strap securement apparatus is adjustable in various respects, including a horizontal strap height adjustment feature to accommodate a variety of refrigeration unit control panel sizes and locations.

The strap securement apparatus can include straps having hook and loop material length adjustment features to quickly and conveniently secure the enclosure of the refrigeration unit.

The strap securement apparatus is lightweight and can be folded to a compact size, so as to be easily transported to and from a trucking rig having a semi-trailer refrigeration unit, and be easily transported among multiple semi-trailer refrigeration units.

A general aspect of the invention is a strap securement apparatus for a class 8 wide-body refrigeration unit of a refrigerated semi-trailer, the refrigerated semi-trailer having a front trailer wall, the refrigeration unit being mounted on the front trailer wall, the refrigeration unit having an enclosure that includes a top cap panel, a top center panel, a curbside panel, a curbside door, a roadside door, a roadside panel, and a bottom panel. The strap securement apparatus includes: a curbside vertical strap configured to extend over the top cap panel, the top center panel, the curbside door, and the bottom panel, the curbside vertical strap having a connector at each end; a roadside vertical strap configured to extend over the top cap panel, the top center panel, the roadside door, and the bottom panel, the roadside vertical strap having a connector at each end; a horizontal strap configured to extend over the curbside panel, the curbside door, the roadside door, and the roadside panel, the horizontal strap having a connector at each end; an upper curbside vertical anti-vibration pad attached to the curbside vertical strap, and configured to extend over at least a portion of the top cap panel and at least a portion of the top center panel; an upper roadside vertical anti-vibration pad attached to the roadside vertical strap, and configured to extend over at least a portion of the top cap panel and at least a portion of the top center panel; a lower curbside vertical anti-vibration pad attached to the curbside vertical strap, and configured to extend over at least a portion of the curbside door and at least a portion of the bottom panel; a lower roadside vertical anti-vibration pad attached to the roadside vertical strap, and configured to extend over at least a portion of the roadside door and at least a portion of the bottom panel; a curbside horizontal anti-vibration pad attached to the horizontal strap, and configured to extend over at least a portion of the curbside panel; a roadside horizontal anti-vibration pad attached to the horizontal strap, and configured to extend over at least a portion of the roadside panel; and a double door horizontal anti-vibration pad attached to the horizontal strap, and configured to extend over at least a portion of the curbside door and at least a portion of the roadside door.

In some embodiments, the strap securement apparatus further includes: a horizontal top center panel strap configured to extend in connected relationship between the curbside vertical strap and the roadside vertical strap.

In some embodiments, each anti-vibration pad includes reflective banding attached thereto.

In some embodiments, the curbside vertical strap and the roadside vertical strap each include a strap height adjustment feature, and the horizontal strap is configured to be adjustable to a plurality of heights along the curbside vertical strap and the roadside vertical strap using the strap height adjustment feature of the curbside vertical strap and the roadside vertical strap.

In some embodiments, the refrigeration unit is attached to the front trailer wall via a frame, and each connector is a flat hook configured to hook onto the frame.

In some embodiments, each connector is a spring snap link configured to engage with an eyebolt secured through the front trailer wall.

In some embodiments, each end of each strap has a length adjustment feature including: a length of front hook material on a front side of the strap, followed by loop material on the front side of the strap, both the length of front hook material and the loop material configured to be threaded through the connector, such that at least a portion of the length of front hook material is engaged with at least a portion of the loop material, thereby providing length adjustability of the strap at each end.

In some embodiments, each end of each strap has a strap storage feature including: a second length of back hook material on a back side of the strap.

In some embodiments, the curbside vertical strap, the roadside vertical strap, and the horizontal strap each have a front side and a back side, each strap having two end portions, the front side of each strap including a length of loop material sewn onto the front side extending between the two end portions, each of the two end portions having a shorter length of front hook material sewn onto the front side of the end portion of the strap.

In some embodiments, the curbside vertical strap, the roadside vertical strap, and the horizontal strap each having a front side and a back side, each strap having two end portions, the back side of each strap being coated with rubber material between the two end portions.

Another general aspect of the invention is a strap securement apparatus for a class 8 wide-body refrigeration unit of a refrigerated semi-trailer, the refrigerated semi-trailer having a front trailer wall, a refrigeration unit being mounted on the front trailer wall, the refrigeration unit having an enclosure that includes a top cap panel, a top center panel, a curbside panel, a curbside door, a roadside door, a roadside panel, and a bottom panel. This strap securement apparatus includes: a curbside vertical strap configured to extend over the top cap panel, the top center panel, the curbside door, and the bottom panel, the curbside vertical strap having a spring snap link at each end; a roadside vertical strap configured to extend over the top cap panel, the top center panel, the roadside door, and the bottom panel, the roadside vertical strap having a spring snap link at each end; a horizontal strap configured to extend over the curbside panel, the curbside door, the roadside door, and the roadside panel, the horizontal strap having a spring snap link at each end; an upper curbside vertical anti-vibration pad attached to the curbside vertical strap, and configured to extend over at least a portion of the top cap panel and at least a portion of the top center panel; an upper roadside vertical anti-vibration pad attached to the roadside vertical strap, and configured to extend over at least a portion of the top cap panel and at least a portion of the top center panel; a lower curbside vertical anti-vibration pad attached to the curbside vertical strap, and configured to extend over at least a portion of the curbside door and at least a portion of the bottom panel; a lower roadside vertical anti-vibration pad attached to the roadside vertical strap, and configured to extend over at least a portion of the roadside door and at least a portion of the bottom panel; a curbside horizontal anti-vibration pad attached to the horizontal strap, and configured to extend over at least a portion of the curbside panel; a roadside horizontal anti-vibration pad attached to the horizontal strap, and configured to extend over at least a portion of the roadside panel; a double door horizontal anti-vibration pad attached to the horizontal strap, and configured to extend over at least a portion of the curbside door and at least a portion of the roadside door; and a horizontal top center panel strap configured to extend in connected relationship between the curbside vertical strap and the roadside vertical strap.

In some embodiments, each anti-vibration pad includes reflective banding attached thereto.

In some embodiments, the curbside vertical strap and the roadside vertical strap each include a strap height adjustment feature, and the horizontal strap is adjustable to a plurality of heights along the curbside vertical strap and the roadside vertical strap using the strap height adjustment feature of the curbside vertical strap and the roadside vertical strap.

In some embodiments, each spring snap link is configured to engage with an eyebolt secured through the front trailer wall.

In some embodiments, each end of each strap has a length adjustment feature including: a length of front hook material on a front side of the strap, followed by loop material on the front side of the strap, both the length of front hook material and the loop material configured to be threaded through the connector, such that at least a portion of the length of front hook material is engaged with at least a portion of the loop material, thereby providing length adjustability of the strap at each end.

In some embodiments, each end of each strap has a strap storage feature including: a second length of front hook material on a back side of the strap.

In some embodiments, the curbside vertical strap, the roadside vertical strap, and the horizontal strap each have a front side and a back side, each strap having two end portions, the front side of each strap including a length of loop material sewn onto the front side extending between the two end portions, each of the two end portions having a shorter length of front hook material sewn onto the front side of the end portion of the strap.

In some embodiments, the curbside vertical strap, the roadside vertical strap, and the horizontal strap each having a front side and a back side, each strap having two end portions, the back side of each strap being coated with rubber material between the two end portions.

BRIEF DESCRIPTION OF THE DRAWINGS

Many additional features and advantages will become apparent to those skilled in the art upon reading the following description, when considered in conjunction with the accompanying figures, wherein.

DETAILED DESCRIPTION

Figure 1:
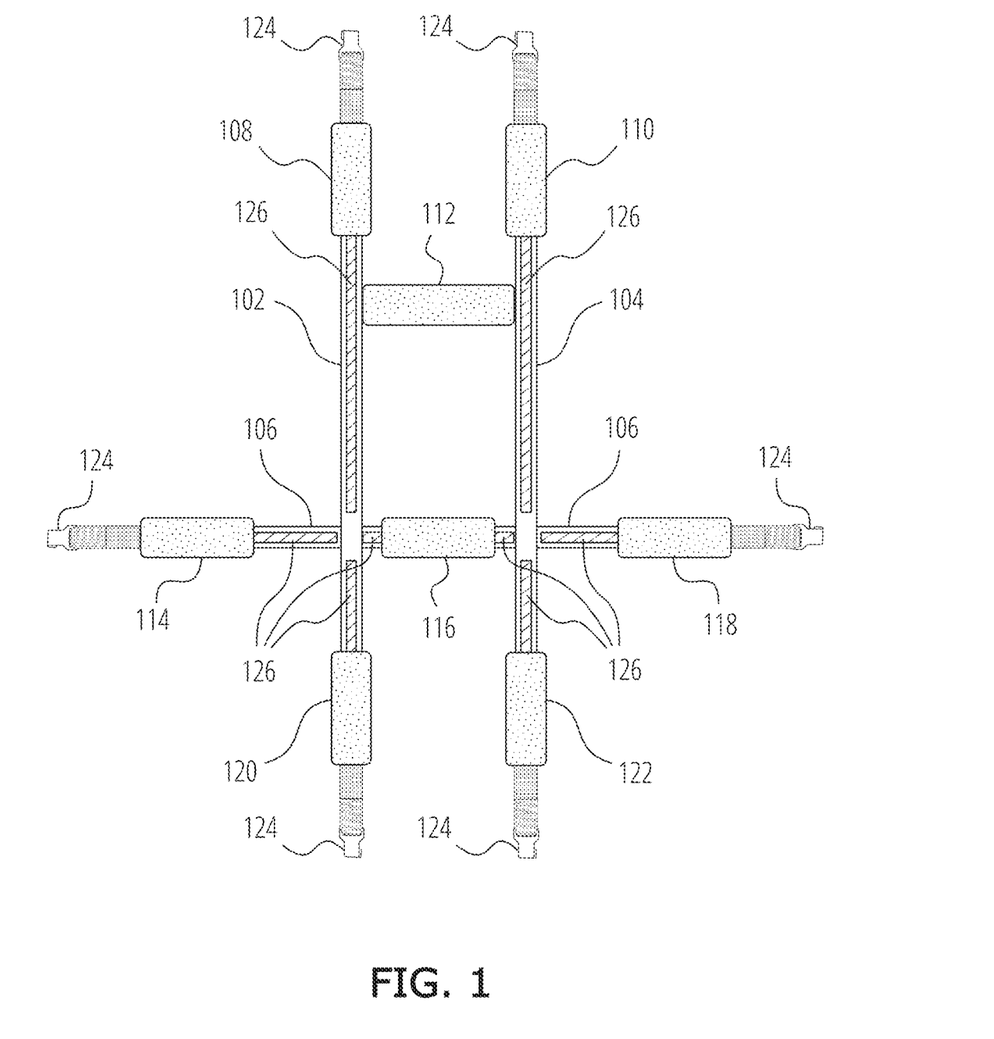
FIG. 1 is a front view of an embodiment of a strap securement apparatus having a curbside vertical strap, a roadside vertical strap, and a horizontal strap, each strap having a flat hook at each end, and a horizontal top center panel strap extending between the curbside vertical strap and the roadside vertical strap, also showing exemplary locations of anti-vibration pads on each strap.

With reference to FIG. 1, a front view of an embodiment of the strap securement apparatus 100 is shown, having a flat hook 124 at each end of a curbside vertical strap 102, a roadside vertical strap 104, and a horizontal strap 106. In this embodiment of the strap securement apparatus 100, each flat hook 124 is configured to be rapidly and easily attached to the back sides of a frame of a refrigeration unit 804 (shown in FIG. 8).

This embodiment of the strap securement apparatus 100 also includes an upper curbside vertical anti-vibration pad 108, an upper roadside vertical anti-vibration pad 110, a curbside horizontal anti-vibration pad 114, a double door horizontal anti-vibration pad 116, a roadside horizontal anti-vibration pad 118, a lower curbside vertical anti-vibration pad 120, and a lower roadside vertical anti-vibration pad 122.

In this embodiment, a horizontal top center panel strap 112 extends between and is connected to the curbside vertical strap 102 and the roadside vertical strap 104. The horizontal top center panel strap 112 reduces vibration of the top center panel 810 (shown in FIG. 8) and helps maintain the spacing between the curbside vertical strap 102 and the roadside vertical strap 104.

Figure 8:
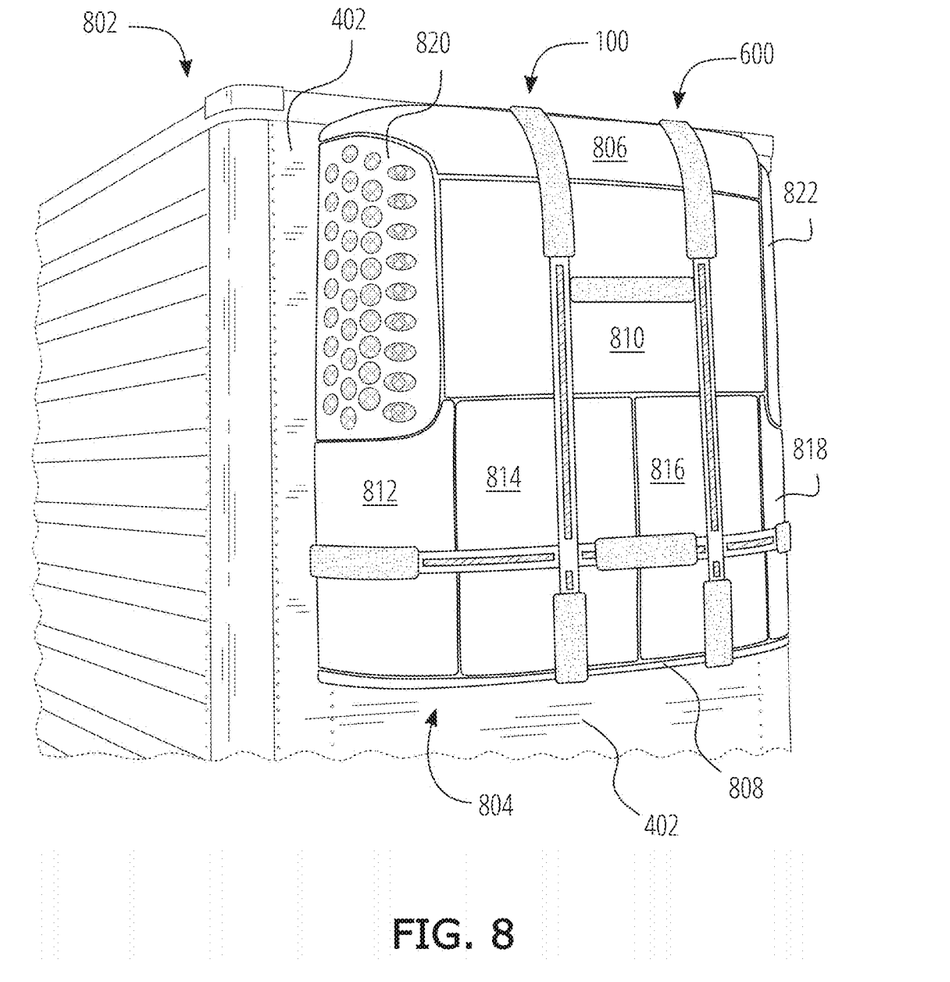
FIG. 8 is a perspective view of the strap securement apparatus of either FIG. 1 or FIG. 6 attached to a refrigeration unit of a refrigerated semi-trailer, also showing the panels and doors of the refrigeration unit that are secured by the strap securement apparatus.

The anti-vibration pads and straps reduce vibration in the panels and doors of the refrigeration unit 804, including a top cap panel 806, a bottom panel 808, a top center panel 810, a curbside panel 812, a curbside door 814, a roadside door 816, and a roadside panel 818 (all shown in FIG. 8). Vibration of the panels and doors can be caused by highway driving, rough roads, engine vibration, wind, buffeting by passing vehicles, and impacts with roadside tree branches, for example.

This embodiment also includes reflective banding 126 on the front surfaces of the curbside vertical strap 102, the roadside vertical strap 104, and the horizontal strap 106. The reflective banding 126 increases visibility of the refrigeration unit 804 (shown in FIG. 8) in low-light conditions.

In some embodiments, each anti-vibration pad can also include attached reflective banding (not shown).

Figure 2A:
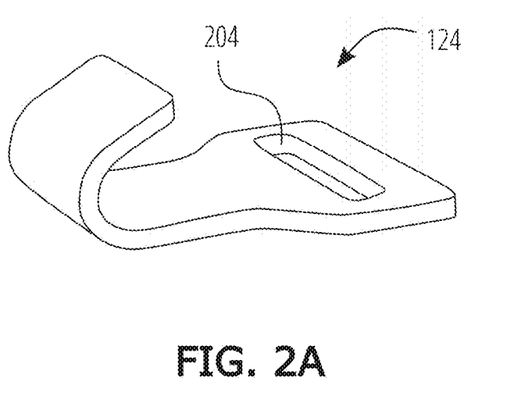
FIG. 2A is a perspective view of a flat hook of FIG. 1 having a strap slot, the flat hook configured to hook onto the frame of the refrigeration unit.

With reference to FIG. 2A, a perspective view of a flat hook 124 having a strap slot 204 is shown, the flat hook 124 configured to hook onto the frame of the refrigeration unit 804 (shown in FIG. 8).

Figure 2B:
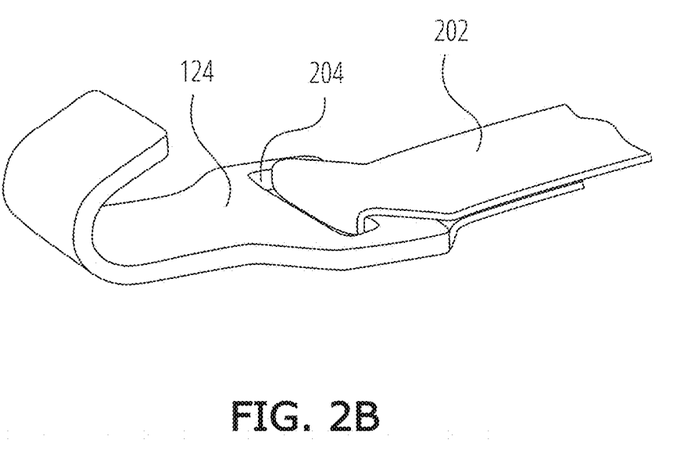
FIG. 2B is a perspective view of a strap threaded through the strap slot of the flat hook of FIG. 2A, the strap having a patch of hook or loop material at an end, followed by a patch of loop or hook material that engages with the hook or loop material at the end after being threaded through the strap slot, thereby providing length adjustability of the strap at each end.

With reference to FIG. 2B, a perspective view is shown of a strap 202 threaded through the strap slot 204 of the flat hook 124 of FIG. 2A, the strap 202 having a patch of hook or loop material at an end, followed by a patch of loop or hook material that engages with the hook or loop material at the end after being threaded through the strap slot 204, thereby providing length adjustability of the strap 202 at each end.

Figure 3:
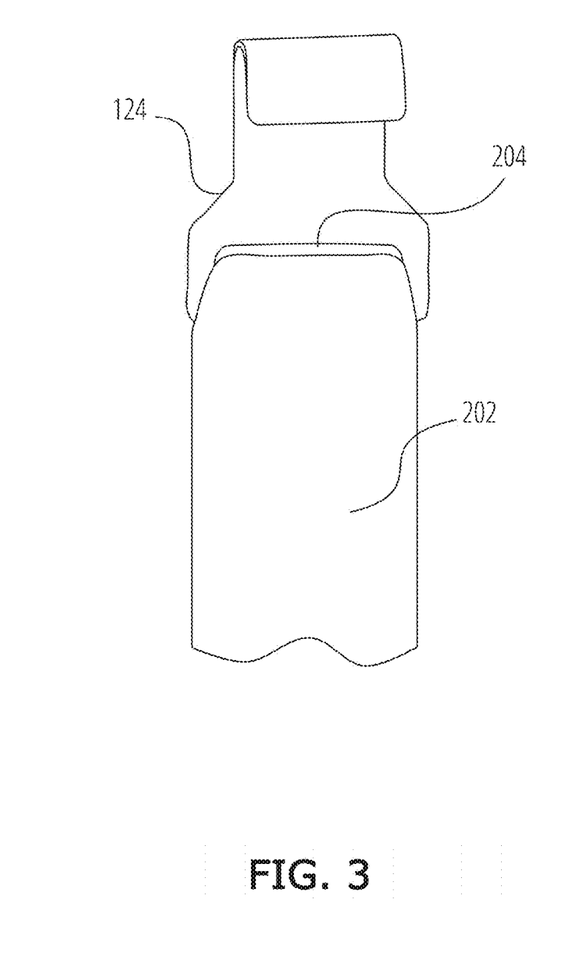
FIG. 3 is a bottom view of the flat hook of FIG. 2B after being threaded through the strap slot, so as to better secure the flat hook to the frame of the refrigeration unit.

With reference to FIG. 3, a bottom view of the flat hook 124 and strap 202 of FIG. 2B is shown, the patch of loop or hook material engaged with the hook or loop material at the end of the strap 202 after being threaded through the strap slot 204, so as to better secure the flat hook 124 to the frame of the refrigeration unit 804 (shown in FIG. 8).

Figure 4A:
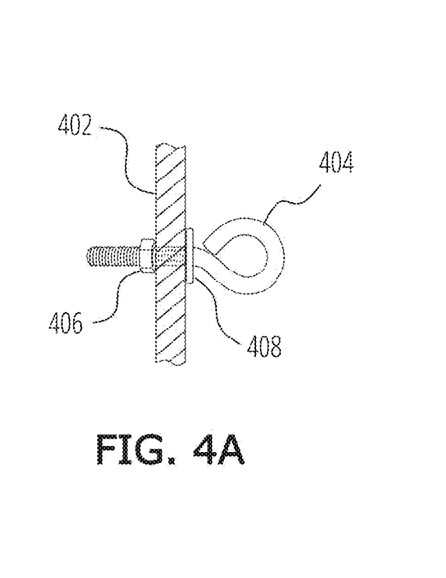
FIG. 4A is a side view of an eyebolt secured through the front trailer wall.

With reference to FIG. 4A, a side view of an eyebolt 404 secured through a front trailer wall 402 is shown, the eyebolt 404 mounted through the front trailer wall 402 and secured by a nut 406 and a washer 408.

Figure 4B:
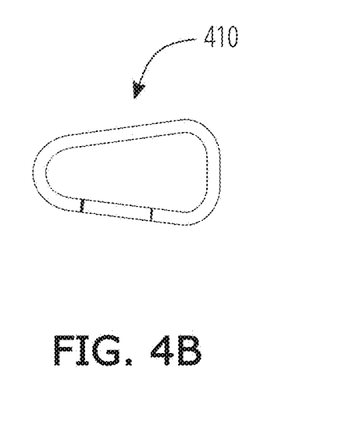
FIG. 4B is a side view of a spring snap link.

With reference to FIG. 4B, a side view of a spring snap link 410 is shown.

Figure 4C:
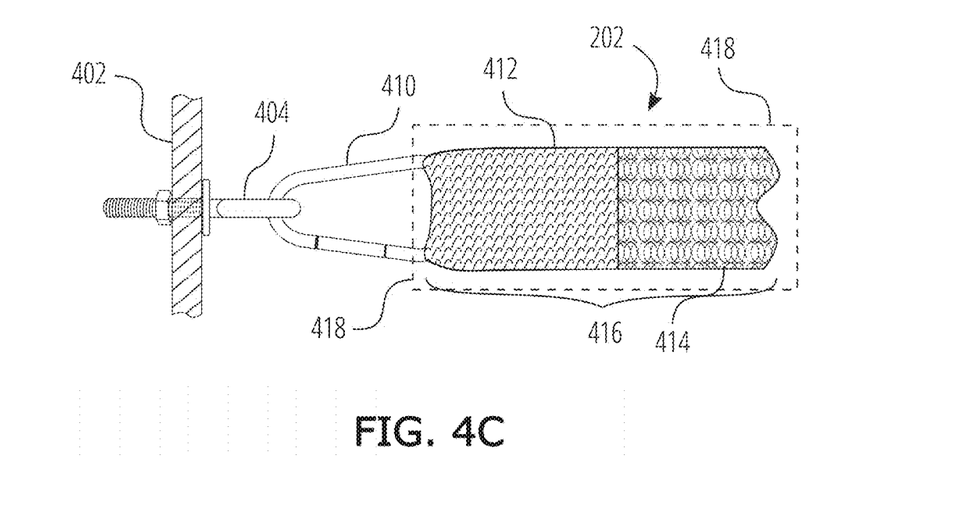
FIG. 4C is a side view of the eyebolt of FIG. 4A rotated 90 degrees and secured through the front trailer wall, the eyebolt now in connected relationship with the spring snap link of FIG. 4B, a strap being threaded through the spring snap link of FIG. 4B, the strap end having a length adjustment feature that includes a length of hook material on the back side of each end of the strap, and having a length of front hook material that engages with the loop material on the front surface of the strap after being threaded through the spring snap link of FIG. 4B, thereby providing length adjustability of the strap at each end.

With reference to FIG. 4C, a side view of the eyebolt 404 of FIG. 4A is shown, the eyebolt 404 secured through the front trailer wall 402, the eyebolt 404 shown in connected relationship with the spring snap link 410 of FIG. 4B, a strap 202 being threaded through the spring snap link 410, the strap 202 having a strap end 416 having a length adjustment feature 418 that includes a back hook material 412 folded over the loop material 414 of the strap 202. The length adjustment feature 418 includes a length of front hook material 502 (shown in FIG. 5A and FIG. 5B) that engages with the loop material 414 after being threaded through the spring snap link of FIG. 4B, thereby providing length adjustability of the strap 202 at each end.

In some embodiments, the spring snap link 410 (not shown) is replaced by an S-hook configured to secure the strap end 416 and to hook onto the eyebolt 404.

Figure 5A:
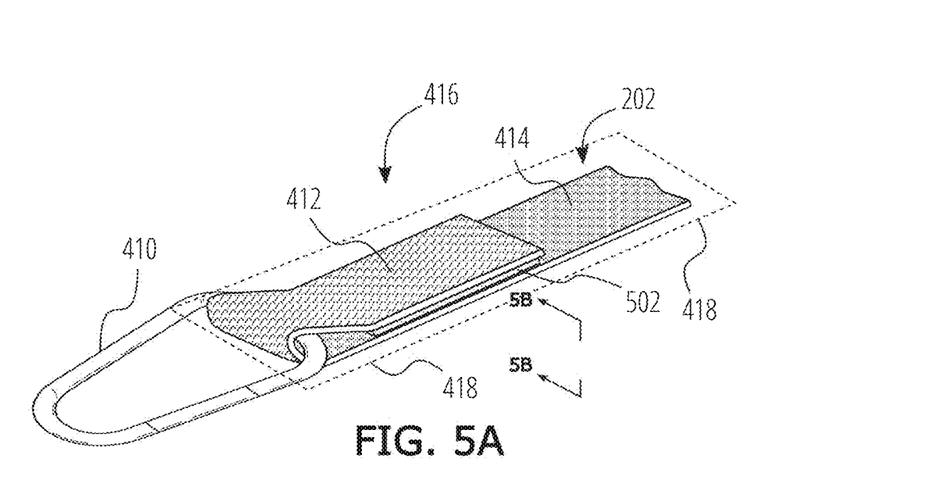
FIG. 5A is a perspective view of the spring snap link and strap end of FIG. 4C, with the end of the strap threaded therethrough and folded over such that the length of front hook material at the end on the front surface of the strap is engaged with the following loop material on the front surface of the strap, thereby providing length adjustability of the strap at each end.

With reference to FIG. 5A, a perspective view of the spring snap link 410 and the strap end 416 of FIG. 4C is shown, with the end of the strap 202 threaded therethrough and folded over. The length adjustment feature 418 of FIG. 4C includes the strap end 416 having a length of front hook material 502 at the end on the front surface of the strap 202, the length of front hook material 502 being engaged with the following loop material 414 on the front surface of the strap 202, thereby providing length adjustability of the strap 202 at each end.

In some embodiments, the length of loop material 414 can be sewn onto the front side of the strap 202, the loop material 414 extending between each strap end 416 of the strap 202.

In some embodiments, the length of front hook material 502 can be sewn onto the front side of the strap 202 at each strap end 416.

Figure 5B:
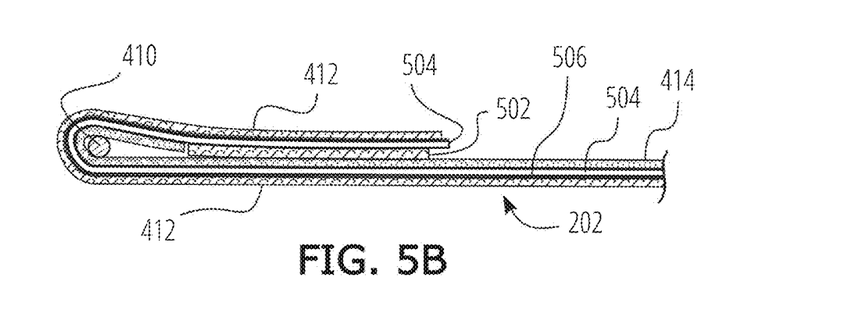
FIG. 5B is a side cross-sectional view of the spring snap link and strap of FIG. 5A, showing the layers along the length of an end of the strap.

With reference to FIG. 5B, a side cross-sectional view of the spring snap link 410 and strap 202 of FIG. 5A is shown, showing the layers along the length of an end of the strap end 416 (shown in FIG. 5A). In this embodiment, the layers include a layer of center strap layer 504 (made from woven nylon, for example), a layer of rubber material 506, and the back hook material 412. The end of the strap 202 is threaded through the spring snap link 410 and folded over such that the length of front hook material 502 at the end on the front surface of the strap 202 is engaged with the following loop material 414 on the front surface of the strap 202, thereby providing length adjustability of the strap 202 at each end.

In this embodiment, the back side of each strap 202 is coated with rubber material 506 along the strap 202 between each strap end 416.

Figure 5C:
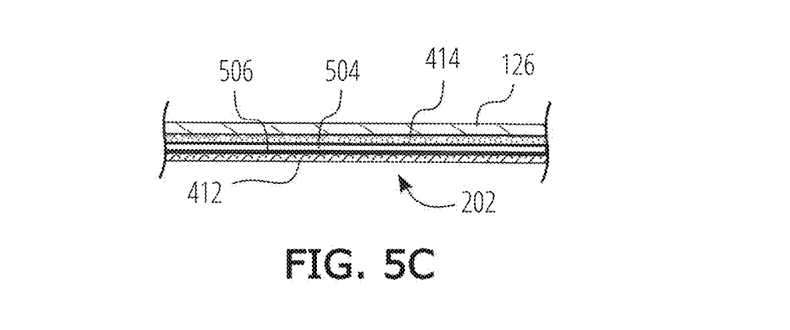
FIG. 5C is a side cross-sectional view of a portion of the strap of FIG. 5B beyond the folded over portion, also showing the reflective banding layer attached to the front side of the strap.

With reference to FIG. 5C, a side cross-sectional view of a portion of the strap 202 beyond the folded over portion shown in FIG. 5B is shown, this embodiment also showing the reflective banding 126 layer attached to the front side of the loop material 414, and also including the center strap layer 504, the layer of rubber material 506, and the back hook material 412.

Figure 6:
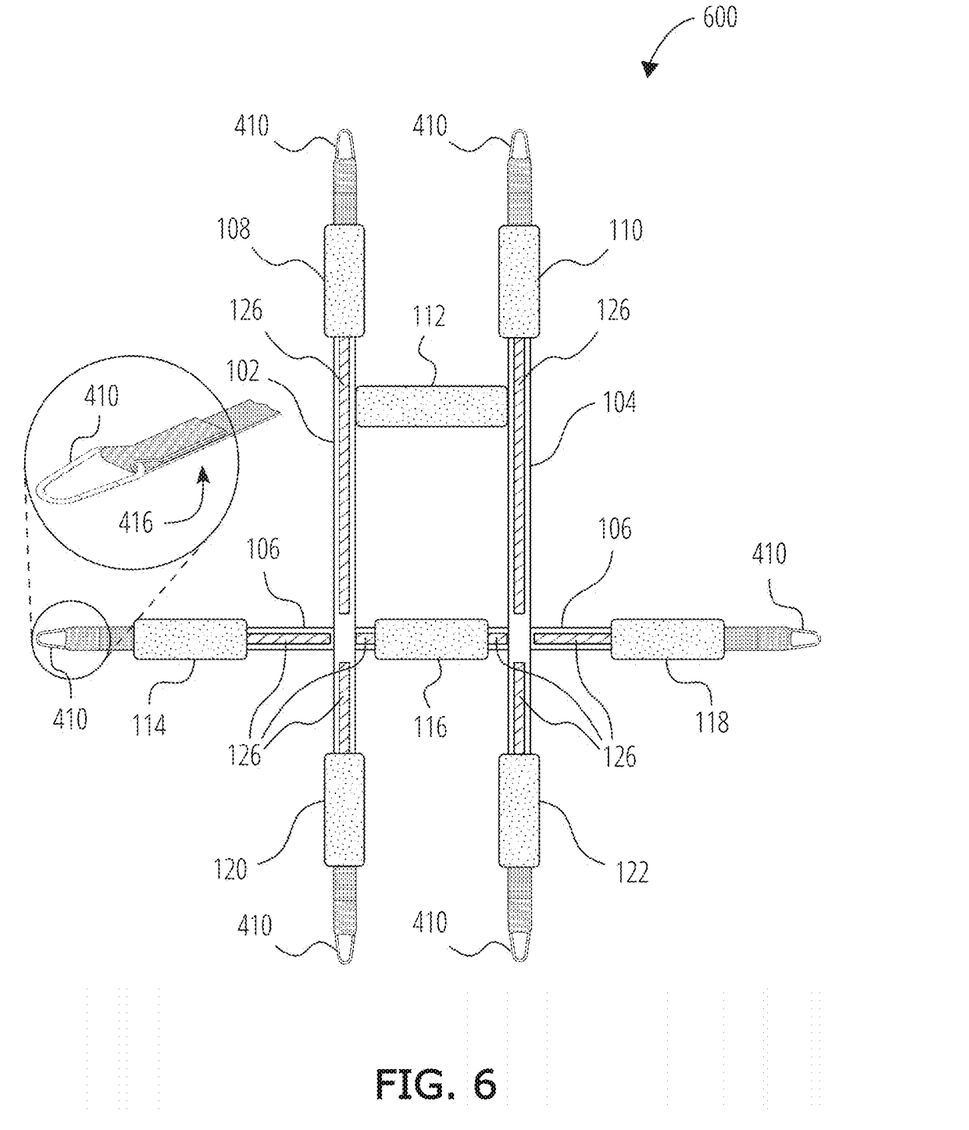
FIG. 6 is a front view of an embodiment of the strap securement apparatus having a curbside vertical strap, a roadside vertical strap, a horizontal strap, and a horizontal top center panel strap extending between the curbside vertical strap and the roadside vertical strap, each strap having a spring snap link at each end as shown in FIG. 5A, the spring snap link configured to engage with an eyebolt secured through the front trailer wall at each end, also showing exemplary locations of anti-vibration pads on each strap.

With reference to FIG. 6, a front view of an embodiment of the strap securement apparatus 600 is shown, having a spring snap link 410 and the strap end 416 at each end of a curbside vertical strap 102, a roadside vertical strap 104, and a horizontal strap 106. In this embodiment, each spring snap link 410 is configured to rapidly and easily engage each eyebolt 404 mounted through the front trailer wall 402 (shown in FIG. 4).

This embodiment of the strap securement apparatus 600 also includes an upper curbside vertical anti-vibration pad 108, an upper roadside vertical anti-vibration pad 110, a horizontal top center panel strap 112, a curbside horizontal anti-vibration pad 114, a double door horizontal anti-vibration pad 116, a roadside horizontal anti-vibration pad 118, a lower curbside vertical anti-vibration pad 120 and a lower roadside vertical anti-vibration pad 122.

The anti-vibration pads and straps reduce the vibrations in the panels and doors of the refrigeration unit 804, including the top cap panel 806, the bottom panel 808, the top center panel 810, a curbside panel 812, the curbside door 814, the roadside door 816 and the roadside panel 818 (all shown in FIG. 8). Vibration of the panels and doors can be caused by highway driving, rough roads, engine vibration, wind, buffeting by passing vehicles, and impacts with roadside tree branches, for example.

This embodiment also includes reflective banding 126 on the front surfaces of the curbside vertical strap 102, the roadside vertical strap 104, and the horizontal strap 106. The reflective banding 126 increases visibility of the refrigeration unit 804 (shown in FIG. 8) in low-light conditions.

In some embodiments, each anti-vibration pad can also include attached reflective banding (not shown).

Figure 7:
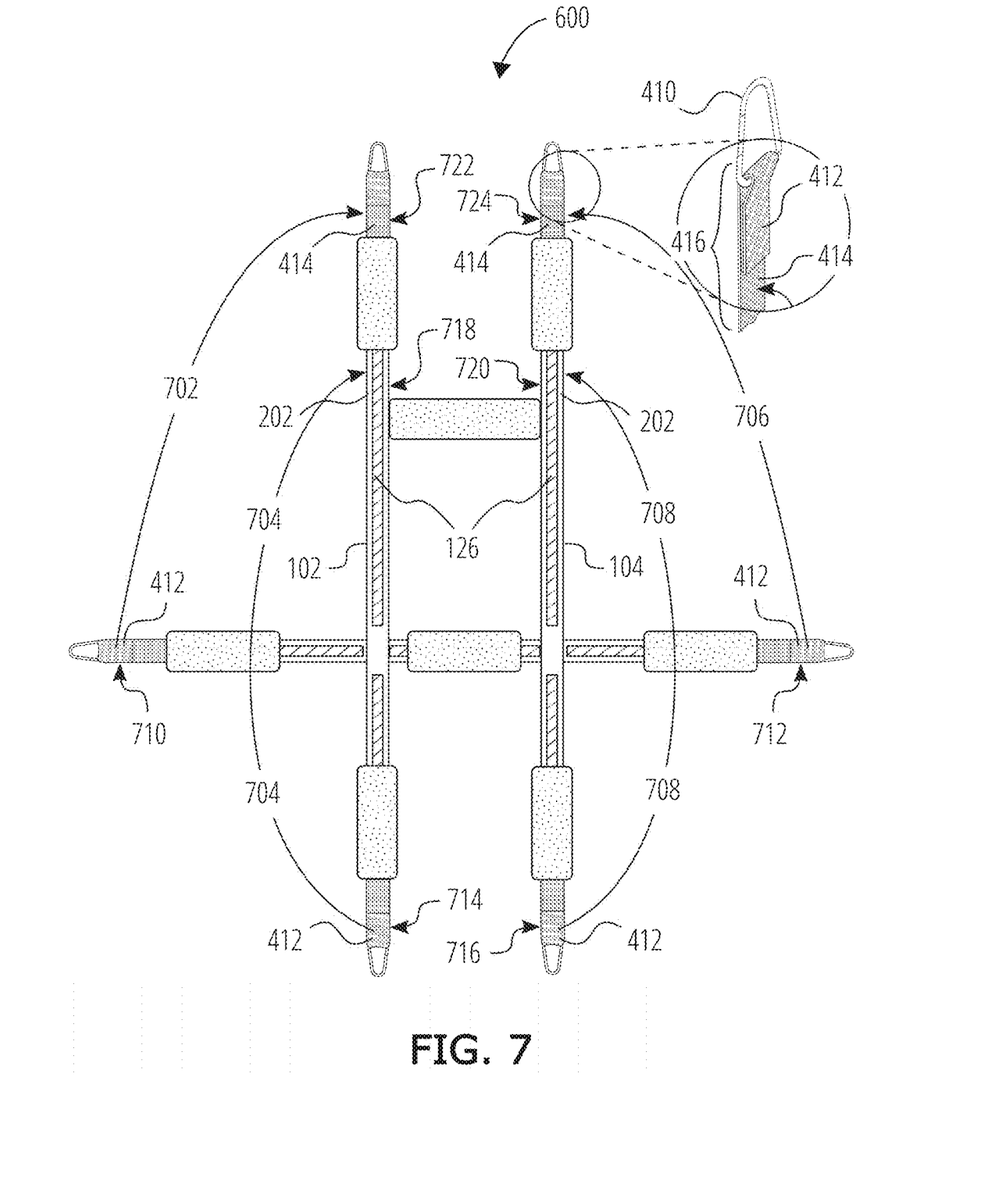
FIG. 7 is a top view of the strap securement apparatus of FIG. 6, showing a length of loop material on the front surface of each strap and a length of folded over back hook material on the end of each strap, so that the strap securement apparatus can be stored while the doors of the refrigeration unit are opened, the lower end of each vertical strap can being attachable to the corresponding upper end or the middle of each vertical strap, the left end of the horizontal strap being attachable to the upper end or the middle of the roadside vertical strap, and the right end of the horizontal strap being attachable to the upper end or the middle of the curbside vertical strap.

With reference to FIG. 7, a top view of the strap securement apparatus 600 of FIG. 6 is shown, wherein there is included a length of hook material on both sides of each end of each strap, so that the lower portions of the strap securement apparatus 600 can be stored by being hung from the upper strap ends 416, while the doors of the refrigeration unit 804 are opened.

In this embodiment, the strap end 416 includes back hook material 412 threaded through the spring snap link 410 and folded over onto the loop material 414 (shown in the circular inset drawing of FIG. 7). The following length of loop material 414 can be used to attach a length of hook material from another strap end 416, such that one or more other strap ends 416 can be stored above the doors of the refrigeration unit 804.

For example, the left end of the horizontal strap 710 can be attached to the upper end of the curbside vertical strap 722 using an upper curbside attachment motion 702, and the right end of the horizontal strap 712 can be attached to the upper end of the roadside vertical strap 724 using an upper roadside attachment motion 706.

In some embodiments, the loop material 414 is accessible on either side of the reflective banding 126 on the curbside vertical strap 102 and the roadside vertical strap 104, and the back hook material 412 on the lower end of each vertical strap can easily be attached to the corresponding middle of each vertical strap.

For example, the lower end of the curbside vertical strap 714 can be attached to the middle of the curbside vertical strap 718 using a lower curbside attachment motion 704, and the lower end of the roadside vertical strap 716 can be attached to the middle of the roadside vertical strap 720 using a lower roadside attachment motion 708.

With reference to FIG. 8, a perspective view is shown of the strap securement apparatus 100 of FIG. 1, or the strap securement apparatus 600 of FIG. 6, attached to the refrigeration unit 804 of a refrigerated semi-trailer 802. The refrigeration unit 804 is attached to the front trailer wall 402 of a class 8 wide-body refrigerated semi-trailer 802.

The refrigeration unit 804 includes the top cap panel 806 and the bottom panel 808. The internal components (not shown) of the refrigeration unit 804 can be accessed via the top center panel 810, the curbside panel 812, the curbside door 814, the roadside door 816, and the roadside panel 818. A curbside vent 820 and a roadside vent 822 allow cool ambient air to enter the refrigeration unit 804 to cool the internal components during operation of the refrigeration unit 804.

In some embodiments, the refrigeration unit 804 is attached to the front trailer wall 402 via a frame, and each connector of the strap securement apparatus is an S-hook configured to hook onto the frame (not shown).

In some embodiments, eyebolts 404 are attached through the front trailer wall 402 (shown in FIG. 4A), and each connector of the strap securement apparatus is an S-hook (not shown) configured to hook onto each corresponding eyebolt 404.

Figure 9:
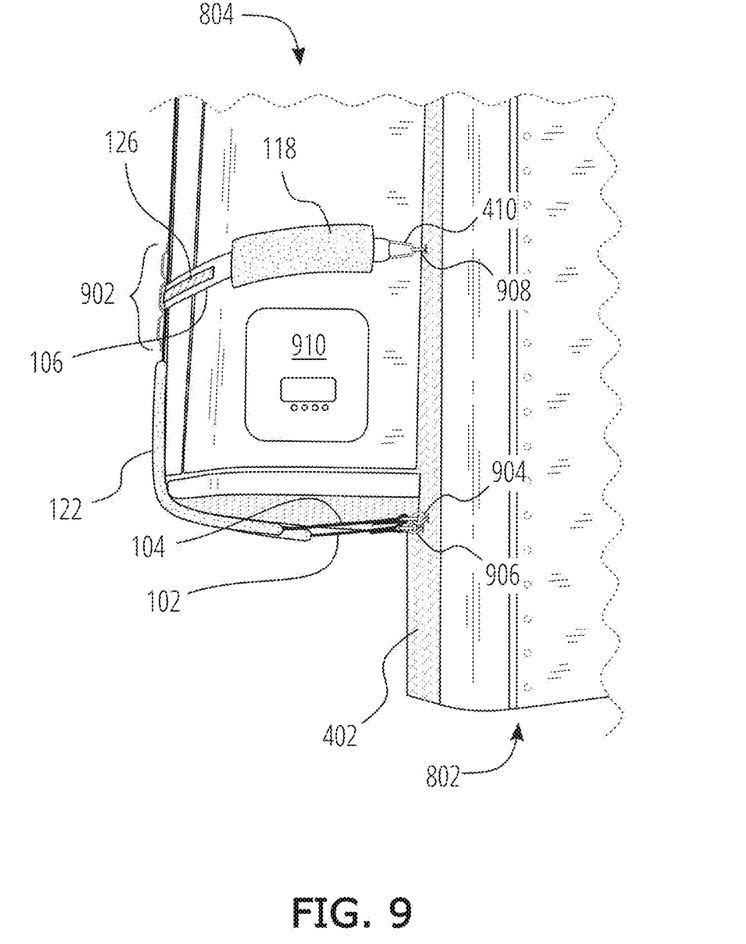
FIG. 9 is a side view of the strap securement apparatus of FIG. 6 attached to the refrigeration unit of a refrigerated semi-trailer, showing the bottoms of the vertical straps secured by eyebolts attached through the front trailer wall, and showing how the height of the horizontal strap can be adjusted by threading through a slot of a height adjustment feature having three slots so as to avoid blocking access to a control panel of the refrigeration unit.
Figure 10A:
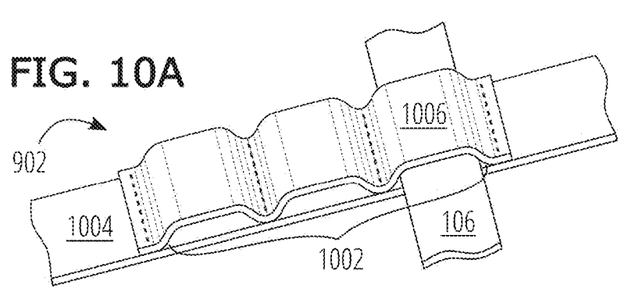
FIG. 10A is a perspective view of a portion of a vertical strap having the height adjustment feature of FIG. 9 including a plurality of slots, this embodiment showing three slots, this view showing the horizontal strap extending through a top slot.

With reference to FIG. 9, a side view of the strap securement apparatus of FIG. 6 attached to the refrigeration unit 804 of a refrigerated semi-trailer 802 is shown. The roadside lower eyebolt 904 secures the lower end of the roadside vertical strap 104 to the front trailer wall 402, and the curbside lower eyebolt 906 secures the curbside vertical strap 102 to the front trailer wall 402. The lower roadside vertical anti-vibration pad 122 and the roadside horizontal anti-vibration pad 118 are also shown. The height of the horizontal strap 106 can be adjusted by threading the horizontal strap 106 through a strap height adjustment feature 902 having a plurality of slots, in this embodiment having three slots 1002 (shown in FIG. 10), the particular slot chosen so as to ensure that the horizontal strap 106 does not block access to a control panel 910 of the refrigeration unit 804. In this embodiment, the reflective banding 126 is also shown.

The horizontal strap 106 is secured to the front trailer wall 402 by two spring snap links 410 (one shown). The slot chosen of the three slots 1002 will also determine the mounting position on the front trailer wall 402 of the roadside horizontal eyebolt 908 and curbside horizontal eyebolt (not shown). The horizontal strap 106 runs from the left spring snap link 410 (not shown) through the one of the three slots 1002, to the curbside spring snap link 410.

With reference to FIG. 10A, a perspective view of a portion of vertical strap 1004 with the strap height adjustment feature 902 of FIG. 9, having a plurality of slots, is shown. In this embodiment, the strap height adjustment feature 902 has three slots 1002, this view showing the horizontal strap 106 extending through a top slot 1006.

Figure 10B:
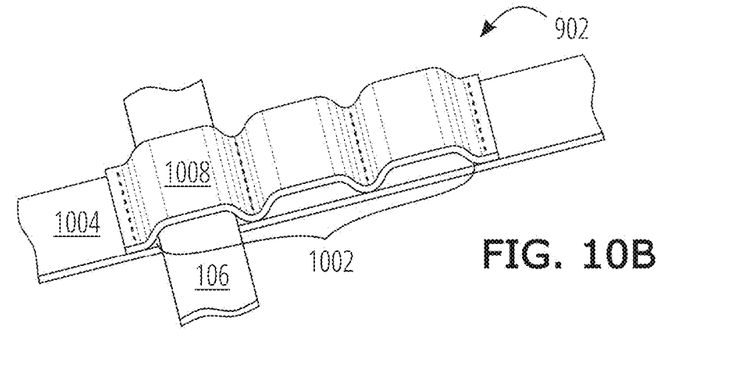
FIG. 10B is a perspective view of the portion of the vertical strap of FIG. 10A, this view showing the horizontal strap extending through a bottom slot.

With reference to FIG. 10B, a perspective view of the portion of vertical strap 1004 of FIG. 10A is shown, this view showing the horizontal strap 106 extending through a bottom slot 1008 of the three slots 1002.

Figure 10C:
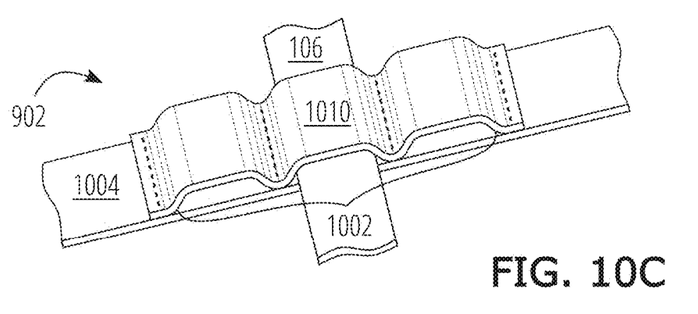
FIG. 10C is a perspective view of the portion of the vertical strap of FIG. 10A, this view showing the horizontal strap extending through a middle slot.

With reference to FIG. 10C, a perspective view of the portion of vertical strap 1004 of FIG. 10A is shown, this view showing the horizontal strap 106 extending through a middle slot 1010 of the three slots 1002.

Other modifications and implementations will occur to those skilled in the art without departing from the spirit and the scope of the invention as claimed. Accordingly, the above description is not intended to limit the invention, except as indicated in the following claims.

What is claimed is:

1. A strap securement apparatus for a class 8 wide-body refrigeration unit of a refrigerated semi-trailer, the refrigerated semi-trailer having a front trailer wall, the refrigeration unit being mounted on the front trailer wall, the refrigeration unit having an enclosure that includes a top cap panel, a top center panel, a curbside panel, a curbside door, a roadside door, a roadside panel, and a bottom panel, the strap securement apparatus comprising:

a curbside vertical strap configured to extend over the top cap panel, the top center panel, the curbside door, and the bottom panel, the curbside vertical strap having a connector at each end;

a roadside vertical strap configured to extend over the top cap panel, the top center panel, the roadside door, and the bottom panel, the roadside vertical strap having a connector at each end;

a horizontal strap configured to extend over the curbside panel, the curbside door, the roadside door, and the roadside panel, the horizontal strap having a connector at each end;

an upper curbside vertical anti-vibration pad attached to the curbside vertical strap, and configured to extend over at least a portion of the top cap panel and at least a portion of the top center panel;

an upper roadside vertical anti-vibration pad attached to the roadside vertical strap, and configured to extend over at least a portion of the top cap panel and at least a portion of the top center panel;

a lower curbside vertical anti-vibration pad attached to the curbside vertical strap, and configured to extend over at least a portion of the curbside door and at least a portion of the bottom panel;

a lower roadside vertical anti-vibration pad attached to the roadside vertical strap, and configured to extend over at least a portion of the roadside door and at least a portion of the bottom panel;

a curbside horizontal anti-vibration pad attached to the horizontal strap, and configured to extend over at least a portion of the curbside panel;

a roadside horizontal anti-vibration pad attached to the horizontal strap, and configured to extend over at least a portion of the roadside panel; and a double door horizontal anti-vibration pad attached to the horizontal strap, and configured to extend over at least a portion of the curbside door and at least a portion of the roadside door.

2. The strap securement apparatus of claim 1, further comprising:

a horizontal top center panel strap configured to extend in connected relationship between the curbside vertical strap and the roadside vertical strap.

3. The strap securement apparatus of claim 1, wherein each anti-vibration pad includes reflective banding attached thereto.

4. The strap securement apparatus of claim 1, wherein the curbside vertical strap and the roadside vertical strap each include a strap height adjustment feature, and the horizontal strap is configured to be adjustable to a plurality of heights along the curbside vertical strap and the roadside vertical strap using the strap height adjustment feature of the curbside vertical strap and the roadside vertical strap.

5. The strap securement apparatus of claim 1, wherein the refrigeration unit is attached to the front trailer wall via a frame, and each connector is a flat hook configured to hook onto the frame.

6. The strap securement apparatus of claim 1, wherein each connector is a spring snap link configured to engage with an eyebolt secured through the front trailer wall.

7. The strap securement apparatus of claim 1, wherein each end of each strap has a length adjustment feature including:

a length of front hook material on a front side of the strap, followed by loop material on the front side of the strap, both the length of front hook material and the loop material configured to be threaded through the connector, such that at least a portion of the length of front hook material is engaged with at least a portion of the loop material, thereby providing length adjustability of the strap at each end.

8. The strap securement apparatus of claim 7, wherein each end of each strap has a strap storage feature including:

a second length of back hook material on a back side of the strap.

9. The strap securement apparatus of claim 1, wherein the curbside vertical strap, the roadside vertical strap, and the horizontal strap each have a front side and a back side, each strap having two end portions, the front side of each strap including a length of loop material sewn onto the front side extending between the two end portions, each of the two end portions having a shorter length of front hook material sewn onto the front side of the end portion of the strap.

10. The strap securement apparatus of claim 1, the curbside vertical strap, the roadside vertical strap, and the horizontal strap each having a front side and a back side, each strap having two end portions, the back side of each strap being coated with rubber material between the two end portions.

11. A strap securement apparatus for a class 8 wide-body refrigeration unit of a refrigerated semi-trailer, the refrigerated semi-trailer having a front trailer wall, a refrigeration unit being mounted on the front trailer wall, the refrigeration unit having an enclosure that includes a top cap panel, a top center panel, a curbside panel, a curbside door, a roadside door, a roadside panel, and a bottom panel, the strap securement apparatus comprising:

a curbside vertical strap configured to extend over the top cap panel, the top center panel, the curbside door, and the bottom panel, the curbside vertical strap having a spring snap link at each end;

a roadside vertical strap configured to extend over the top cap panel, the top center panel, the roadside door, and the bottom panel, the roadside vertical strap having a spring snap link at each end;

a horizontal strap configured to extend over the curbside panel, the curbside door, the roadside door, and the roadside panel, the horizontal strap having a spring snap link at each end;

an upper curbside vertical anti-vibration pad attached to the curbside vertical strap, and configured to extend over at least a portion of the top cap panel and at least a portion of the top center panel;

an upper roadside vertical anti-vibration pad attached to the roadside vertical strap, and configured to extend over at least a portion of the top cap panel and at least a portion of the top center panel;

a lower curbside vertical anti-vibration pad attached to the curbside vertical strap, and configured to extend over at least a portion of the curbside door and at least a portion of the bottom panel;

a lower roadside vertical anti-vibration pad attached to the roadside vertical strap, and configured to extend over at least a portion of the roadside door and at least a portion of the bottom panel;

a curbside horizontal anti-vibration pad attached to the horizontal strap, and configured to extend over at least a portion of the curbside panel;

a roadside horizontal anti-vibration pad attached to the horizontal strap, and configured to extend over at least a portion of the roadside panel;

a double door horizontal anti-vibration pad attached to the horizontal strap, and configured to extend over at least a portion of the curbside door and at least a portion of the roadside door; and a horizontal top center panel strap configured to extend in connected relationship between the curbside vertical strap and the roadside vertical strap.

12. The strap securement apparatus of claim 11, wherein each anti-vibration pad includes reflective banding attached thereto.

13. The strap securement apparatus of claim 11, wherein the curbside vertical strap and the roadside vertical strap each include a strap height adjustment feature, and the horizontal strap is adjustable to a plurality of heights along the curbside vertical strap and the roadside vertical strap using the strap height adjustment feature of the curbside vertical strap and the roadside vertical strap.

14. The strap securement apparatus of claim 11, wherein each spring snap link is configured to engage with an eyebolt secured through the front trailer wall.

15. The strap securement apparatus of claim 11, wherein each end of each strap has a length adjustment feature including:

a length of front hook material on a front side of the strap, followed by loop material on the front side of the strap, both the length of front hook material and the loop material configured to be threaded through the connector, such that at least a portion of the length of front hook material is engaged with at least a portion of the loop material, thereby providing length adjustability of the strap at each end.

16. The strap securement apparatus of claim 15, wherein each end of each strap has a strap storage feature including:
   a second length of front hook material on a back side of the strap.

17. The strap securement apparatus of claim 11, wherein the curbside vertical strap, the roadside vertical strap, and the horizontal strap each have a front side and a back side, each strap having two end portions,
   the front side of each strap including a length of loop material sewn onto the front side extending between the two end portions,
   each of the two end portions having a shorter length of front hook material sewn onto the front side of the end portion of the strap.

18. The strap securement apparatus of claim 11, wherein the curbside vertical strap, the roadside vertical strap, and the horizontal strap each has a front side and a back side, each strap having two end portions, the back side of each strap being coated with rubber material between the two end portions.

\* \* \* \* \*